(12) United States Patent
Kano et al.

(10) Patent No.: US 12,412,887 B2
(45) Date of Patent: Sep. 9, 2025

(54) LITHIUM SECONDARY BATTERY

(71) Applicant: Panasonic Intellectual Property Management Co., Ltd., Osaka (JP)

(72) Inventors: Akira Kano, Osaka Fu (JP); Ryohei Miyamae, Osaka Fu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 771 days.

(21) Appl. No.: 17/638,545

(22) PCT Filed: Jul. 28, 2020

(86) PCT No.: PCT/JP2020/028820
§ 371 (c)(1),
(2) Date: Feb. 25, 2022

(87) PCT Pub. No.: WO2021/039242
PCT Pub. Date: Mar. 4, 2021

(65) Prior Publication Data
US 2022/0407047 A1 Dec. 22, 2022

(30) Foreign Application Priority Data

Aug. 30, 2019 (JP) ................................. 2019-158506

(51) Int. Cl.
*H01M 4/134* (2010.01)
*H01M 4/02* (2006.01)
(Continued)

(52) U.S. Cl.
CPC ........... *H01M 4/134* (2013.01); *H01M 4/623* (2013.01); *H01M 10/0525* (2013.01);
(Continued)

(58) Field of Classification Search
CPC .. H01M 4/134; H01M 4/623; H01M 10/0525; H01M 10/0569;
(Continued)

(56) References Cited

U.S. PATENT DOCUMENTS

| 7,776,478 B2 | 8/2010 | Klaassen |
| 2013/0017441 A1 | 1/2013 | Affinito et al. |

(Continued)

FOREIGN PATENT DOCUMENTS

| CN | 104335395 A | 2/2015 |
| CN | 109256520 A | 1/2019 |

(Continued)

OTHER PUBLICATIONS

Office Action dated Sep. 29, 2023, issued in counterpart CN Application No. 202080059372.5. with partial English translation. (12 pages).

(Continued)

*Primary Examiner* — Ula C Ruddock
*Assistant Examiner* — Sarika Gupta
(74) *Attorney, Agent, or Firm* — WHDA, LLP (57) ABSTRACT

A lithium secondary battery includes a positive electrode, a negative electrode, a lithium ion conductive nonaqueous electrolyte, and a separator disposed between the positive electrode and the negative electrode. On the negative electrode, lithium metal deposits during charging, and the lithium metal is dissolved during discharging; the negative electrode includes a negative electrode current collector, and a plurality of layers stacked on the negative electrode current collector; the plurality of layers include a first layer, a second layer, and a third layer; of the first to third layers, the first layer is closest to the negative electrode current collector, and the third layer is farthest from the negative electrode current collector; the first layer contains a material capable (Continued)

of storing lithium ions; the second layer contains lithium metal, and the third layer has an insulation property and a lithium ion permeability.

13 Claims, 2 Drawing Sheets (51) Int. Cl.
*H01M 4/62* (2006.01)
*H01M 10/0525* (2010.01)
*H01M 10/0569* (2010.01)

(52) U.S. Cl.
CPC .. *H01M 10/0569* (2013.01); *H01M 2004/021* (2013.01); *H01M 2004/027* (2013.01); *H01M 2300/0034* (2013.01)

(58) Field of Classification Search
CPC ..... H01M 2004/021; H01M 2004/027; H01M 2300/0034; H01M 4/0445; H01M 4/133; H01M 4/525; H01M 4/62; H01M 2010/4292; H01M 4/366; H01M 4/382; H01M 4/587; H01M 10/0568; Y02E 60/10; Y02P 70/50
See application file for complete search history.

(56) References Cited

U.S. PATENT DOCUMENTS

| 2013/0171502 | A1 | 7/2013 | Chen et al. |
| 2014/0050981 | A1 | 2/2014 | Kang et al. |
| 2015/0295246 | A1 | 10/2015 | Son et al. |
| 2016/0204476 | A1 | 7/2016 | Kobayashi |
| 2016/0372743 | A1 | 12/2016 | Cho et al. |
| 2017/0104209 | A1 | 4/2017 | Son et al. |
| 2017/0244093 | A1 | 8/2017 | Fan |
| 2019/0051926 | A1 | 2/2019 | Chao et al. |
| 2019/0067702 | A1 | 2/2019 | Son et al. |
| 2020/0075990 | A1* | 3/2020 | Park ...................... H01M 4/667 |
| 2021/0336274 | A1 | 10/2021 | Jung et al. |

FOREIGN PATENT DOCUMENTS

| JP | 2002-343437 A | 11/2002 |
| JP | 2003-162997 A | 6/2003 |
| JP | 2004-192829 A | 7/2004 |
| JP | 2004-259483 A | 9/2004 |
| JP | 2005-251472 A | 9/2005 |
| JP | 2016-527679 A | 9/2016 |
| JP | 2017-517835 A | 6/2017 |
| JP | 2019-505971 A | 2/2019 |
| KR | 20130116822 A | 10/2013 |
| KR | 20140078173 A | 6/2014 |
| KR | 20170014216 A | 2/2017 |
| WO | 2015/030230 A1 | 3/2015 |
| WO | 2018/236166 A1 | 12/2018 |
| WO | 2019/045399 A2 | 3/2019 |

OTHER PUBLICATIONS

Extended (Supplementary) European Search Report dated Oct. 28, 2022, issued in counterpart EP application No. 20857312.1. (9 pages).

International Search Report dated Oct. 27, 2020, issued in counterpart International Application No. PCT/JP2020/028820, w/English Translation. (7 pages).

Office Action dated Mar. 21, 2024, issued in counterpart CN application No. 202080059372.5, with partial English translation. (9 pages).

* cited by examiner

LITHIUM SECONDARY BATTERY

TECHNICAL FIELD

The present invention relates to an improvement in lithium secondary batteries.

BACKGROUND ART

Nonaqueous electrolyte secondary batteries are used for ICTs such as personal computers and smart phones, automobiles, power storage, and the like, and are required to have high capacities. Lithium-ion batteries are known as a high-capacity nonaqueous electrolyte secondary battery. Higher capacities of the lithium-ion battery can be achieved, for example, by using graphites and alloy active materials in combination as a negative electrode active material. As an alloy active material, silicon, a silicon compound, or the like has been proposed. However, the capacity increase of the lithium ion battery is reaching the limit.

Lithium secondary batteries (lithium metal secondary batteries) are promising as a high-capacity nonaqueous electrolyte secondary battery exceeding lithium ion batteries. In the lithium secondary battery, lithium metal deposits on the negative electrode during charging, and the lithium metal is dissolved in the nonaqueous electrolyte during discharging.

When the lithium secondary battery is charged, lithium metal can deposit in a dendrite form on the negative electrode. However, when dendrite is generated, the specific surface area of the negative electrode increases, and side reactions tend to increase. Therefore, the discharge capacity and cycle characteristics are likely to deteriorate.

PTL 1 proposes forming a lithium ion conductive protective layer on at least one surface of a lithium electrode including a porous carbon body and a lithium metal inserted into pores of the porous carbon body.

PTL 2 proposes a lithium metal anode including a lithium metal layer, and a multilayer polymer coating on the lithium metal layer, the multilayer polymer coating including a first outer polymer crosslinked gel layer disposed to contact a battery electrolyte, wherein the first outer polymer crosslinked gel layer includes a first polymer, a soft segment polymer, and an electrolyte within the crosslinked matrix, and including a second inner layer disposed between the lithium metal layer and the first outer polymer crosslinked gel layer, wherein the second inner layer includes a second polymer that provides mechanical strength and physical barrier to the lithium metal layer. It is believed that the multilayer polymer coating can suppress or reduce the growth of lithium dendrite, thereby improving the cycle life of batteries.

CITATION LIST

Patent Literature

PTL 1: Japanese Laid-Open Patent Publication No. 2015-517853
PTL 2: U.S. Patent Application Publication No. 2016/0372743

SUMMARY OF INVENTION

In the methods of PTLs 1 and 2, a lithium metal may deposit in a dendrite form between the lithium ion conductive protective layer or the multilayer polymer coating and the separator. Therefore, it is difficult to sufficiently improve the cycle characteristics.

In view of the above, one aspect of the present invention relates to a lithium secondary battery including a positive electrode, a negative electrode, a lithium ion conductive nonaqueous electrolyte, and a separator disposed between the positive electrode and the negative electrode, wherein on the negative electrode, a lithium metal deposits during charging and the lithium metal is dissolved during discharging; the negative electrode includes a negative electrode current collector, and a plurality of layers stacked on the negative electrode current collector; the plurality of layers include a first layer, a second layer, and a third layer; of the first to third layers, the first layer is closest to the negative electrode current collector, and the third layer is farthest from the negative electrode current collector; the first layer contains a material capable of storing lithium ions, the second layer contains a lithium metal, and the third layer has an insulation property and a lithium ion permeability.

In the lithium secondary battery of the present invention, the deposition of lithium metal between the third layer and the separator are suppressed, so that the cycle characteristics are improved.

DESCRIPTION OF EMBODIMENTS

A lithium secondary battery according to the present embodiment includes a positive electrode, a negative electrode, a lithium ion conductive nonaqueous electrolyte, and a separator disposed between the positive electrode and the negative electrode. On the negative electrode, lithium metal deposits during charging, and the lithium metal is dissolved during discharging. The negative electrode includes a negative electrode current collector and a plurality of layers stacked on the negative electrode current collector. The plurality of layers includes a first layer, a second layer, and a third layer. Of the first to third layers, the first layer is closest to the negative electrode current collector, and the third layer is farthest from the negative electrode current collector. The first layer includes a material capable of storing lithium ions. The second layer includes a lithium metal. The third layer has an insulating property and a lithium ion permeability.

Hereinafter, the components of the lithium (metal) secondary battery will be described in detail.

The negative electrode includes a negative electrode current collector formed of a metal that does not react with lithium metal. For example, a metal foil can be used as the negative electrode current collector. Examples of the metal forming the negative electrode current collector include copper (Cu), nickel (Ni), iron (Fe), and alloys containing such metal element(s). For the alloy, for example, a copper alloy and stainless steel (SUS) are preferred. Among them, in terms of excellent conductivity, copper and/or a copper alloy is preferred. The copper content in the negative electrode current collector is preferably 50% by mass or more, and may be 80% by mass or more. The thickness of the negative electrode current collector is not particularly limited, and is, for example, 5 μm to 20 μm.

(First Layer)

It is considered that the first layer functions as an induction layer that attracts lithium ions to the negative electrode current collector side from the third layer at the initial stage of charging. Lithium ions are preferentially stored in the first layer during charging. When the first layer is filled with lithium ions, lithium ions deposit on the first layer as lithium metal.

The material capable of storing lithium ions contained in the first layer involves with only a part of the charge capacity. The rest of the capacity is largely realized by the involvement of dissolution and deposition of the lithium metal forming the second layer. Thus, the first layer may be thin, and the thicker the second layer can be formed, the higher the volume energy density of battery.

If the first layer is not present, a part of the lithium ions may be deposited on the surface of the third layer on the separator side during charging. This is probably because, when the first layer is not present, during initial charging, the starting points of the lithium metal deposition are unevenly formed, which tends to grow the lithium metal locally. Especially when a slight defect is present in the third layer, the lithium metal tends to grow to the surface of the third layer on the separator side from such a defect as the starting point. Such lithium metal tends to grow as dendrites and tends to be isolated. When the lithium metal is isolated, it becomes impossible to participate in charging and discharging, and the capacity retention rate decreases.

For the material capable of storing lithium ions contained in the first layer (hereinafter, also referred to as an active material), for example, a material which can be used also as a negative electrode active material of lithium-ion batteries can be used. Specifically, a carbon material capable of storing and releasing lithium ions electrochemically, a metal capable of alloying with lithium, and a metal compound can be used.

Among them, a carbon material is preferred in terms of low cost. Examples of the carbon material include natural graphite, artificial graphite, hard carbon, soft carbon, carbon black, and carbon nanotubes.

A film of a metal alloyable with lithium (hereinafter referred to as a metal film) may be formed as the first layer. The metal film is excellent in that it is easy to form a thin and uniform first layer, and lithium ions are more uniformly attracted to the surface of the first layer.

Specific examples of the metal for forming the metal film include aluminum, zinc, silicon, and tin.

Examples of the metal compound include a silicon compound, an oxide such as a tin compound, and a spinel compound such as lithium titanate.

The thickness of the first layer may be, for example, 20 μm or less when a particulate material such as a carbon material, a metal compound, or the like is used as the active material, and may be 10 μm or less. In order to more uniformly attract lithium ions to the surface of the first layer, the first layer containing these particulate materials may have a thickness of 5 μm or more.

When a metal film is formed as the first layer, the thickness of the first layer may be, for example, 1 μm or less, and may be 0.1 μm or less. However, in order to more uniformly attract lithium ions to the surface of the first layer, it is desirable to have a thickness of 0.01 μm or more.

The thickness of the first layer is determined as the average value of the thicknesses of any five points of the first layer in the cross section in the thickness direction of the negative electrode.

(Second Layer)

Immediately after battery assembly, the negative electrode may have no second layer. During the initial charge, lithium ions are stored in the first layer, and subsequently lithium metal deposits between the first layer and the third layer to form the second layer. Battery may be designed such that a small thickness of the second layer remains in the fully discharged state thereafter. If even a small amount of the second layer is present in the fully discharged state, in the subsequent charging, lithium ions are likely to permeate the third layer and be attracted to the second layer, and are likely to deposit so as to uniformly increase the thickness of the second layer. This is thought to be because the second layer stably provides a uniform starting point for further lithium metal deposition. Therefore, deposition of lithium metal between the third layer and the separator is suppressed, and the cycle characteristics are improved.

The fully discharged state of the lithium secondary battery is, when the rated capacity of battery is regarded as C, a state in which the battery is discharged until a state of charge (SOC: State of Charge) is 0.05× C or less. For example, it refers to a condition in which the battery is discharged to the lower limit voltage at a constant current of 0.05 C. The lower limit is, for example, 2.5V to 3.0V. On the other hand, the fully charged state of the lithium secondary battery refers to a state in which the battery is charged to a state of charge (SOC) of 0.95× C or more when the rated capacity of battery is regarded as C. For example, it refers to a condition in which the battery is charged to the upper limit voltage at a constant current of 0.05 C.

The thickness of the second layer may be, for example, 1 to 50 μm, and may be 1 to 30 μm. In the fully discharged state, the second layer may be designed to be thin, for example, 1 to 5 μm or 2 to 5 μm. In the fully charged state, the second layer may be designed to be thick, for example, 10 to 30 μm or 20 to 25 μm.

The thickness of the second layer is determined as the average value of the thicknesses of any five points of the second layer in the cross section in the thickness direction of the negative electrode.

(Third Layer)

The third layer has a lithium ion permeability and an insulation property (is electrically insulating). Only lithium ions that have penetrated the third layer and have reached the surface of the first or second layer receive electrons, and lithium metal deposits there. Therefore, it is basically suppressed that the lithium metal is deposited on the surface of the third layer on the separator side.

If the third layer is not present, it is difficult to control the growth direction of the lithium metal during charging, and the lithium metal tends to deposit as dendrite. In order to suppress dendrite, it is necessary to control the deposition direction of lithium metal by the third layer.

If the first layer is not present, the starting point of the deposition of the lithium metal is not stably formed on the negative electrode current collector, and the lithium metal easily deposits locally in a non-uniform manner. Therefore, dendrites easily grow through the third layer.

The third layer has an insulating property and a lithium ion permeability, and may be, for example, a porous film made of an insulating material. The porous film has pores through which lithium ions can pass. The porous film may have a three dimensional network structure so as to form communicating pores, and may have a through hole.

The porous film may have, for example, a matrix of an insulating polymer. The matrix of the polymer has a porous structure or network structure which can swell with a solvent of a nonaqueous electrolyte. Lithium ions migrate in the nonaqueous electrolyte held in the matrix.

The type of the insulating polymer may be any type capable of forming a matrix capable of holding a nonaqueous electrolyte, and is not particularly limited. Polymers capable of forming the porous film can be, for example, fluororesins such as polytetrafluoroethylene (PTFE), polyvinylidene fluoride (PVdF), copolymers of vinylidene fluoride and hexafluoropropylene (VdF-HFP), a copolymer of vinylidene fluoride and trifluoroethylene (VdF-TrFE), a resin having a polyoxyalkylene structure such as polyethylene oxide structure, polyacrylonitrile (PAN), polyimide resin, acrylic resin, polyolefin resin, urethane resin, polycarbonate resin, epoxy resin and the like. Among them, a fluororesin is desirable in consideration of chemical stability, affinity with nonaqueous electrolytes, and the like.

Among the fluororesins, a fluororesin having a unit (—$CH_2$—$CF_2$—)-derived from vinylidene fluoride is preferred in terms of swelling property with respect to nonaqueous electrolytes. Examples of the fluororesin having a unit derived from vinylidene fluoride include PVdF, VdF-HFP, VdF-TrFE, and the like.

The porous film may include at least one selected from the group consisting of a lithium salt and a normal temperature molten salt. Both the lithium salt and the normal temperature molten salt enhance the lithium ion conductivity of the porous film and impart flexibility to the porous film.

The third layer may be a single layer structure or a multilayer structure. When each layer forming the multilayer structure has a through hole, lithium ions reach the surface of the first layer or the second layer through the through hole provided in each layer, and receive electrons. Here, when the third layer has a multilayer structure, the positions of the through holes of each layer do not match in many places, and there are almost no through holes that penetrate all the layers all the way. Therefore, even if lithium metal generated by receiving electrons from the first layer or the second layer is grown and enters the through hole, it is difficult to grow to the separator side. Thus, the lithium metal is prevented from being deposited on the surface of the third layer on the separator side.

The diameter of the through hole is not particularly limited as long as lithium ions can pass therethrough. The average diameter of the through holes may be, for example, in the range of 100 nm or more and 1000 nm or less, or in the range of 200 nm or more and 800 nm or less.

The average diameter of the through-holes is an average value of the through-holes included in a 2 mm square region when the main surface of the porous film is viewed from the normal direction. The average diameter of the through hole may be calculated from the cross section in the thickness direction of the negative electrode. For example, the average diameter of the through hole is determined as follows: select any ten through holes from the cross section of the length 10 mm in the thickness direction of the negative electrode, and an average value of these widths is calculated. The width of the through hole is the length in the direction perpendicular to the thickness direction of the negative electrode. Scanning electron microscope (SEM) may be used for the measurement of the width of the through hole.

As the third layer, a solid electrolyte layer may be formed. The solid electrolyte layer may be a dense layer having lithium ion conductivity. As the solid electrolyte, an oxide solid electrolyte, a sulfide solid electrolyte, or the like is used.

For the oxide solid electrolyte, for example, NASICON type solid electrolyte represented by $LiTi_2(PO_4)_3$ and its element substituted version, perovskite-type solid electrolyte of $(LaLi)TiO_3$ system, a LISICON type solid electrolyte represented by $Li_{14}ZnGe_4O_{16}$, $Li_4SiO_4$, $LiGeO_4$ and its element substituted version, and garnet-type solid electrolyte represented by $Li_7La_3Zr_2O_{12}$ and its element substituted version can be used.

As the oxide solid electrolyte, a polyoxymetalate compound represented by general formula: $Li_xMO_y$ (M is at least one kind selected from the group consisting of B, Al, Si, P, Ti, V, Zr, Nb, Ta, and La, and satisfies $0.5<x\leq9$, $1\leq y<6$) may be used. Examples of the polyoxymetalate compound include $Li_3PO_4$, $Li_2SiO_3$, $Li_4SiO_4$, $Li_2Si_2O_5$, $LiTaO_3$ and the like.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, $Li_{10}GeP_2S_{12}$, or the like can be used.

The thickness of the third layer is not particularly limited, but is desirably not excessively large from the viewpoint of increasing the capacity. On the other hand, it is desirable that the third layer has a thickness enough to withstand expansion and contraction of the negative electrode due to charge and discharge. The thickness of the third layer may be, for example, 5 μm or less, and may be 0.1 μm or more and 5 μm or less, and may be 0.5 μm or more and 2.5 μm or less.

The thickness of the third layer is determined as the average value of the thicknesses of any five points of the third layer in the cross section in the thickness direction of the negative electrode.

Normally, the negative electrode is larger than the positive electrode, and a part of the main surface of the negative electrode current collector does not face the positive electrode mixture layer. The lithium metal tends to deposit on a portion of the negative electrode current collector facing the positive electrode mixture layer. Therefore, the third layer may have a region facing the positive electrode mixture layer (facing region) and a non-facing region not facing the positive electrode mixture layer.

If the third layer has facing and non-facing regions, contact between the non-facing region of the third layer and the negative current collector can be maintained even in a charged state. Therefore, the distance between the facing region of the third layer and the negative electrode current collector or the first layer is limited, and the lithium metal (second layer) deposits while being appropriately pressed. By pressing the second layer, dendrite growth is suppressed. When the lithium metal deposits, the growth of the lithium metal is regulated in the thickness (Z-axis) direction of the negative electrode current collector, while the growth of the lithium metal is not regulated in any manner in plane (XY-plane) direction of the negative electrode current collector. That is, the lithium metal tends to extend easily in the X-Y plane direction and hardly extend in the Z-axis direction, and the tendency to suppress the growth of dendrites increases.

Figure 1:
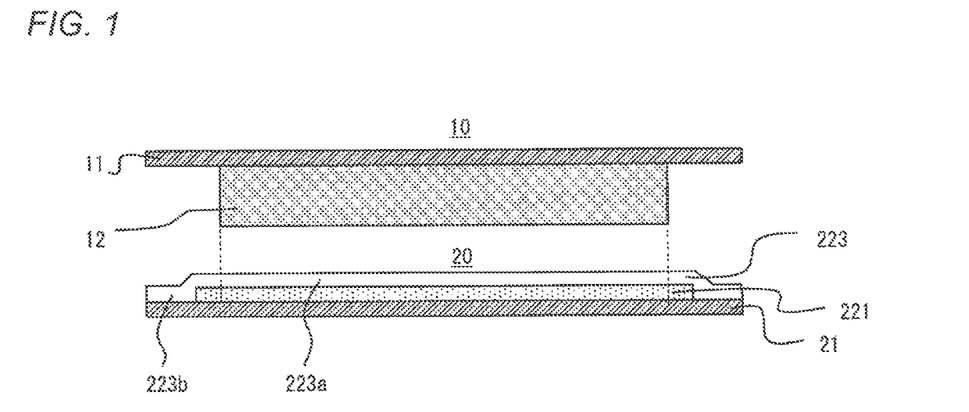
FIG. 1 A cross-sectional view schematically illustrating a positive electrode and a negative electrode immediately after battery assembly according to an embodiment of the present invention.

FIG. 1 is a cross-sectional view schematically illustrating the positive electrode and the negative electrode immediately after battery assembly in accordance with the present embodiment. A negative electrode 20 immediately after battery assembly includes a negative electrode current collector 21, a first layer 221 formed on the surface of the negative electrode current collector 21, and a third layer 223 formed to cover the first layer 221. On the other hand, a positive electrode 10 includes a positive electrode current collector 11 and a positive electrode mixture layer 12 formed on the surface of the positive electrode current collector 11.

The first layer 221 is the underlying layer of the second layer 222, and therefore is formed so as to face the entire positive electrode mixture layer 12, and has a larger outer shape than the positive electrode mixture layer 12. The third layer 223 has a facing region 223a facing the positive electrode mixture layer 12 and a non-facing region 223b not facing the positive electrode mixture layer 12, and a part of the non-facing region 223b is in contact with the negative electrode current collector 21.

Figure 2:
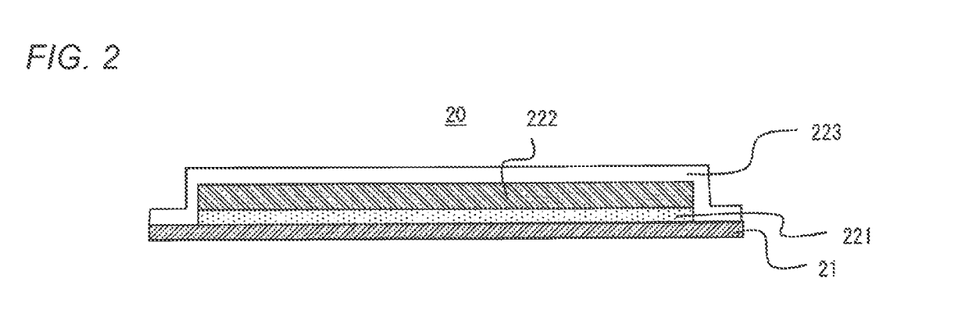
FIG. 2 A cross-sectional view schematically illustrating a negative electrode in a charged state according to an embodiment of the present invention.

FIG. 2 is a cross-sectional view schematically showing a negative electrode in a charged state according to the present embodiment. When the lithium secondary battery is charged, lithium metal is deposited between the first layer 221 and the third layer 223 as a second layer 222, as shown in FIG. 2. At this time, contact between the negative electrode current collector 21 and the non-facing region 223b of the third layer 223 is maintained. Therefore, as described above, the distance between the negative electrode current collector 21 and the facing region 223a of the third layer 223 is limited, and the lithium metal deposits while being appropriately pressed.

Figure 3:
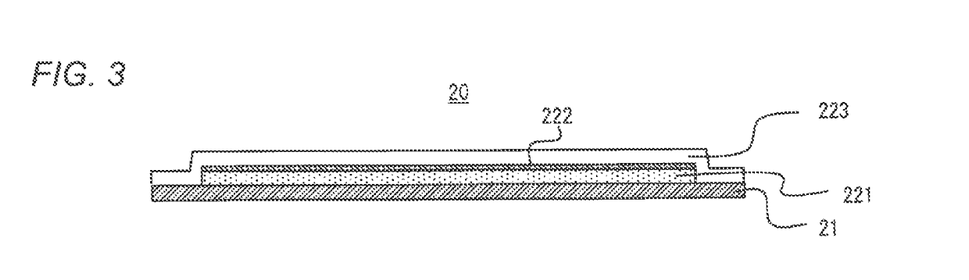
FIG. 3 A cross-sectional view schematically illustrating a negative electrode in a discharged state according to an embodiment of the present invention.
Figure 4:
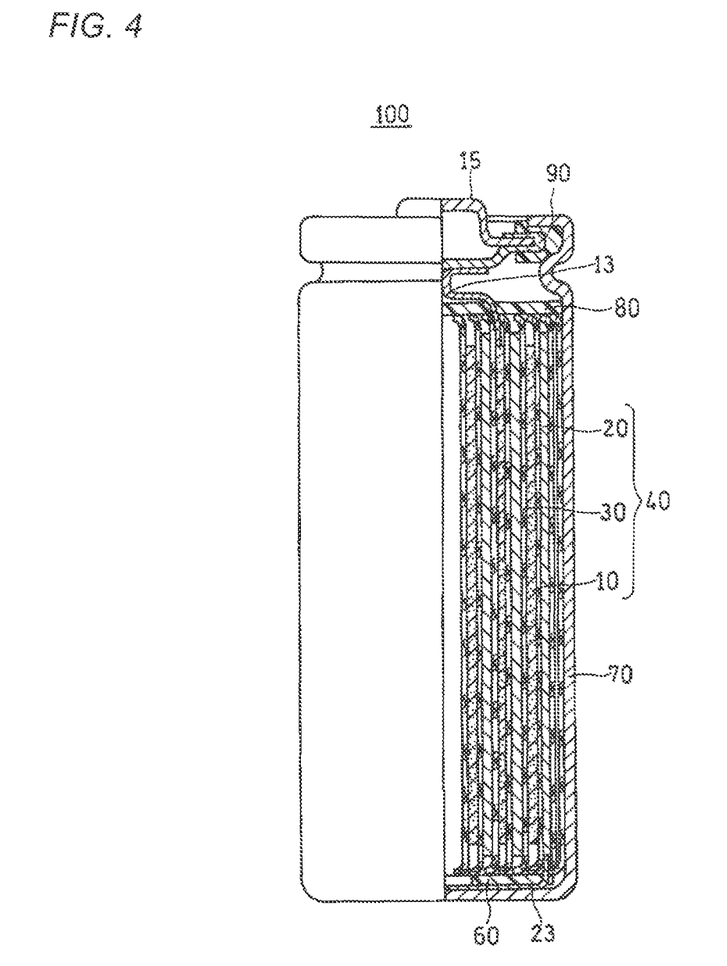
FIG. 4 A vertical cross-sectional view schematically illustrating a lithium secondary battery according to an embodiment of the present invention.

FIG. 3 is a cross-sectional view schematically showing the negative electrode in the discharged state according to the present embodiment. When the lithium secondary battery is discharged, the lithium metal dissolves from the second layer 222 and the second layer 222 having a slight thickness remains between the first layer 221 and the third layer 223, as shown in FIG. 3. The second layer 222, which has a slight thickness remaining, is the starting point for the deposition of lithium metal during the next charge. The second layer 222 is uniformly formed on the entire surface of the first layer 221. Therefore, at the time of the next charge, lithium metal is deposited so as to uniformly increase the thickness of the second layer 222 over the entire surface of the second layer 222.

[Method for Forming the First Layer]

When the active material is a carbon material, a metal compound, or the like, the first layer can be formed in the same manner as, for example, a conventional negative electrode mixture layer for lithium-ion batteries. Specifically, a mixture containing an active material as an essential component and containing a binder, a conductive agent, and the like as optional components is mixed together with a liquid component as a dispersion medium to prepare a slurry. The obtained slurry is applied to at least one main surface of the negative electrode current collector, and the coating film is dried, thereby forming a first layer. The coating film after drying may be rolled to form the first layer.

Examples of the binder include, resin materials, for example, fluororesins, such as polytetrafluoroethylene (PTFE) and PVdF; polyolefin resins, such as polyethylene and polypropylene; polyamide resins, such as aramid resins; polyimide resins, such as polyimide and polyamideimide; acrylic resins, such as polyacrylic acid, polymethyl acrylate, and ethylene-acrylic acid copolymers; vinyl resins, such as PAN and polyvinyl acetate; polyvinylpyrrolidone; polyethersulfone; rubbery materials, such as styrene-butadiene copolymer rubber (SBR), and the like. These may be used singly or in combination of two or more.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more.

When the active material is a metal, and forming a metal film as the first layer, the first layer may be formed by a thin film forming method such as vapor deposition, sputtering, electrolytic plating, and electroless plating.

[Method of Forming the Third Layer]

In the case of a porous film, the third layer may be formed, for example, by coating a raw material liquid of the third layer on the surface of the first layer and then drying it. The raw material liquid includes, for example, an insulating material (or an insulating polymer) and a solvent. Examples of the solvent include N-methyl-2-pyrrolidone (NMP) and the like.

As a solvent, a good solvent having high compatibility with the insulating material used and a poor solvent having low compatibility with the insulating material used may be used.

When a good solvent and a poor solvent are used, in the coating film, a region containing an insulating material and a good solvent is separated from a region containing a poor solvent. By separation, the region containing the poor solvent is disposed so as to be interposed between regions containing the insulating material. Then, by drying to remove the solvent, a through hole and even a non-through hole are formed between the regions containing the insulating material. For example, by the type of the solvent and the mass ratio of the good solvent and the poor solvent, the pore diameter, the porosity, and the like of the porous film obtained are controlled.

In the formation of the third layer, at least one selected from the group consisting of a lithium salt and a normal temperature molten salt (hereinafter, also simply referred to as a salt) may be used. When a good solvent and a salt are used, in a coating film, a region containing an insulating material, a good solvent and a salt and having a high concentration of an insulating material is separated from a region containing an insulating material and a good solvent and having a lower concentration of an insulating material. By then drying to remove the solvent, a through-hole, and even a non-through-hole, are formed so as to correspond to a region of the lower insulating material concentration. At this time, the salt remains in the porous film. For example, depending on the type and concentration of the salt, pore size, porosity, and the like of the porous film obtained are controlled.

The good solvent and the poor solvent may be appropriately selected depending on the insulating material used. When a good solvent and a poor solvent are used in combination, the good solvent and the poor solvent may have different boiling points, for example, by 10° C. or more, because the pores are easily formed.

As the lithium salt, for example, a known one used in a nonaqueous electrolyte of lithium secondary battery can be used. Specific examples of the anion of the lithium salt include anions of $BF_4-$, $ClO_4-$, $PF_6-$, $CF_3SO_3-$, $CF_3CO_2-$, and oxalates, and anions of imides described later as anions of normal temperature molten salts. The anions of oxalates may contain boron and/or phosphorus. An anion of oxalates may be an anion of an oxalate complex. Examples of the anions of oxalates include difluorooxalate borate ($BF_2(C_2O_4)$—), bisoxalate borate ($B(C_2O_4)_2$—), $B(CN)_2(C_2O_4)$—, $PF_4(C_2O_4)$—, $PF_2(C_2O_4)_2$—, and the like. The lithium salt may be used singly or in combination of two or more.

The normal temperature molten salt is a salt of liquid at normal temperature (20° C. to 40° C.), and is also referred to as an ionic liquid. The normal temperature molten salt may be a salt of an organic onium cation and an anion of an imide in that pores are easily formed. The normal temperature molten salt may be used singly or in combination of two or more.

As the organic onium cation, in addition to a cation derived from an aliphatic amine, an alicyclic amine, an aromatic amine, or the like (e.g., a quaternary ammonium cation), a nitrogen-containing onium cation such as an organic onium cation having a nitrogen-containing heterocyclic ring (that is, a cation derived from a cyclic amine); a sulfur-containing onium cation; a phosphorus-containing onium cation (e.g., a quaternary phosphonium cation), and the like can be used. The organic onium cation may have a functional group such as a hydroxyl group (—OH) or a silanol group (—Si—OH), and may have a divalent group derived from silanol or the like (e.g., —SiO—).

Among them, from the viewpoint of heat resistance, a cation having a nitrogen-containing heterocyclic ring is preferred. Examples of the nitrogen-containing heterocyclic skeleton include pyrrolidine, imidazoline, imidazole, pyridine, and piperidine. Specific examples include N-methyl-N-propylpiperidinium cation, N,N,N-trimethyl-N-propylammonium cation, and 1-methyl-1-propylpyrrolidinium cation.

As anions of imides, $N(SO_2C_mF_{2m+1})(SO_2C_nF_{2n+1})$— (m and n are each independently an integer of 0 or more) is used. Each of "m" and "n" may be 0 to 3, and may be 0, 1 or 2. The anion of imides may be bis (trifluoromethylsulfonyl) imide anion ($N(SO_2CF_3)_2$—, TFSI-), bis(perfluoroethylsulfonyl) imide anion ($N(SO_2C_2F_5)_2$—), or bis (fluorosulfonyl) imide anion ($N(SO_2F)_2$—). In particular, it may be bis (fluorosulfonyl) imide anion, or TFSI-.

The concentration of the salt in the raw material liquid is not particularly limited, and may be appropriately set in consideration of the pore diameter, porosity, and the like of the pores of the porous film to be formed. For example, the concentration of salt may be 0.5% by mass to 30% by mass, and may be 1% by mass to 10% by mass.

The concentration of the insulating material in the raw material liquid is not particularly limited, and may be appropriately set in consideration of the thickness or the like of the porous film to be formed. The concentration of the insulating material may be, for example, 3% by mass to 35% by mass, and may be 5% by mass to 15% by mass.

When the third layer is a solid electrolyte layer, for example, a solid electrolyte layer may be formed by exposing the surface of the first layer to an atmosphere containing a raw material of the solid electrolyte. The atmosphere containing a raw material of the solid electrolyte is preferably at 200° C. or less, and an atmosphere of 120° C. or less is more preferable. The solid electrolyte layer is preferably formed by a liquid phase method or a gas phase method.

As the liquid phase method, a deposition method, a sol-gel method, or the like is preferred. These methods include, for example, the following process: a negative electrode current collector having a first layer formed thereon is immersed in a solution at a temperature sufficiently lower than 200° C.; in the solution, a raw material of a solid electrolyte is dissolved; and the solid electrolyte or a precursor gel thereof is deposited or precipitated on the surface of the first layer.

Examples of the gas phase method include a physical vapor deposition (PVD) method, chemical vapor deposition (CVD) method, atomic layer deposition (ALD) method, and the like. The PVD method and the CVD method are usually performed at a high temperature exceeding 200° C. In the ALD method, a solid electrolyte layer can be formed in an atmosphere of 200° C. or less including a raw material of a solid electrolyte, and further 120° C. or less. In the ALD method, an organic compound having a high vapor pressure is used as a raw material of a solid electrolyte. By vaporizing such a raw material, a molecule of the raw material can be interacted with the surface of the first layer.

[Positive Electrode]

The positive electrode includes a positive electrode mixture layer containing a positive electrode active material and a positive electrode current collector. The positive electrode mixture layer can be formed by coating a positive electrode slurry in which a positive electrode mixture containing a positive electrode active material, a binder, and a conductive agent is dispersed in a dispersion medium on a surface of a positive electrode current collector and drying the slurry. The dried film may be rolled, if necessary. The positive electrode mixture layer may be formed on one surface of the positive electrode current collector, or may be formed on both surfaces.

When the positive electrode active material contains a composite oxide containing lithium and a transition metal, a molar ratio: $M_{Li}/M_{TM}$ of an amount of a sum of lithium $M_{Li}$ included in the positive electrode and the negative electrode to an amount of the transition metal Mmi included in the positive electrode may be 1.1 or less. That is, in a lithium secondary battery (lithium metal secondary battery), most (or all) of lithium involved in charge and discharge is derived from a composite oxide containing lithium and a transition metal, i.e., a positive electrode active material.

Here, the total amount of lithium $M_{Li}$ included in the positive electrode and the negative electrode means a total amount of lithium included in the positive electrode mixture layer per unit area and the negative electrode per unit area facing the positive electrode mixture layer, more specifically, the total amount of lithium included in the first layer and the second layer. The amount of the transition metal $M_{TM}$ included in the positive electrode refers to the amount of the transition metal included in the positive electrode mixture layers per the above-mentioned unit area.

The molar ratio of lithium to transition metal contained in the composite oxide: lithium/transition metal may be, for example, 0.9 to 1.1.

Examples of the positive electrode active material include a layered rock salt type composite oxide. Specifically, examples of the positive electrode active material include $Li_aCO_2$, $Li_aNiO_2$, $Li_aMnO_2$, $Li_aCo_bNi_{1-b}O_2$, $Li_aCo_bM_{1-b}O_c$ (M is at least one selected from the group consisting of Na, Mg, Sc, Y, Mn, Fe, Ni, Cu, Zn, Al, Cr, Pb, Sb, and B), $Li_aNi_bM_{1-b}O_c$ (M is at least one selected from the group consisting of Na, Mg, Sc, Y, Mn, Fe, Co, Cu, Zn, Al, Cr, Pb, Sb, and B), $LiMPO_4$ (M is at least one selected from the group consisting of Na, Mg, Sc, Y, Mn, Fe, Co, Ni, Cu, Zn, Al, Cr, Pb, Sb, and B). Equations $0<a \leq 1.1$, $0 \leq b \leq 0.9$, and $2 \leq c \leq 2.3$ are satisfied. Note that the value "a" indicating the molar ratio of lithium is increased or decreased by charging and discharging.

Among them, a composite oxide of a layered rock salt type containing a nickel element is preferable. Such a composite oxide is represented by $Li_aNi_xM_{1-x}O_2$ (M is at least one selected from the group consisting of Mn, Co, and Al, and satisfies $0<a\leq 1.1$ and $0.3\leq x\leq 1$). In view of increasing the capacity, it is preferable that $0.85\leq x\leq 1$ is satisfied. Further, in view of stabilization of the crystal structure, lithium-nickel-cobalt-aluminum composite oxide (NCA): $Li_aNi_xCo_yAl_zO_2$ ($0<a\leq 1.1$, $0.85\leq x<1$, $0<y<0.15$, $0<z\leq 0.1$, $x+y+z=1$) containing Co and Al as M is more preferable. Specific examples of NCAs include $LiNi_{0.8}Co_{0.15}Al_{0.05}O_2$, $LiNi_{0.8}Co_{0.18}Al_{0.02}O_2$, and $LiNi_{0.9}Co_{0.05}Al_{0.05}O_2$.

As the binder, resin materials can be used, including, for example, fluororesins, such as PTFE, PVdF; polyolefin resins, such as polyethylene and polypropylene; polyamide resins, such as aramid resin; polyimide resins, such as polyimide and polyamideimide; acrylic resins, such as polyacrylic acid, polymethyl acrylate, and ethylene-acrylic acid copolymers; vinyl resins, such as PAN and polyvinyl acetate; polyvinylpyrrolidone; polyethersulfone; and rubbery materials, such as styrene-butadiene copolymer rubber (SBR). These can be used singly or in combination of two or more.

Examples of the conductive agent include: graphite, such as natural graphite and artificial graphite; carbon blacks, such as acetylene black; conductive fibers, such as carbon fibers and metal fibers; fluorinated carbon; powders of metal such as aluminum; conductive whiskers, such as zinc oxide and potassium titanate; conductive metal oxides, such as titanium oxide; and organic conductive materials, such as phenylene derivatives. These can be used singly or in combination of two or more.

The shape and thickness of the positive electrode current collector can be selected based on the shapes and ranges of the negative electrode current collector. As the material of the positive electrode current collector, for example, stainless steel, aluminum (Al), aluminum alloy, and titanium can be used.

[Nonaqueous Electrolyte]

As the nonaqueous electrolyte, one having lithium ion conductivity is used. Such a nonaqueous electrolyte contains a nonaqueous solvent and lithium ions and anions dissolved in a nonaqueous solvent. The nonaqueous electrolyte may be in a liquid state or in a gel state.

The liquid nonaqueous electrolyte is prepared by dissolving a lithium salt in a nonaqueous solvent. By dissolving the lithium salt in a nonaqueous solvent, lithium ions and anions are generated, but the nonaqueous electrolyte may contain an undissociated lithium salt.

The gel-like nonaqueous electrolyte includes a liquid nonaqueous electrolyte and a matrix polymer. As the matrix polymer, for example, a polymer material which absorbs the nonaqueous solvent and forms gel is used. Examples of such a polymer material include fluororesin, acrylic resin, and/or polyether resin.

As the lithium salt, a known one used in a nonaqueous electrolyte of lithium secondary batteries can be used. Specific examples thereof include a compound exemplified as a lithium salt used for forming a porous film. The nonaqueous electrolyte may contain one kind of these lithium salts, and may contain two or more kinds thereof.

From the viewpoint of further suppressing the lithium metal from depositing in a dendrite state, the nonaqueous electrolyte may include at least one of anions of imides and anions of oxalates. In particular, an anion of an oxalate containing boron is preferable. Anions of oxalates containing boron can be used in combination with other anions. Other anions may be anions of $PF_6^-$ and/or imides.

The concentration of the lithium salt in the nonaqueous electrolyte may be, for example, 0.5 mol/L or more and 3.5 mol/L or less. The concentration of the lithium salt is a sum of the concentration of the dissociated lithium salt and the concentration of the undissociated lithium salt. The concentration of anions in the nonaqueous electrolyte may be 0.5 mol/L or more and 3.5 mol/L or less.

Examples of the nonaqueous solvent include esters, ethers, nitriles, amides, or halogen substitutes thereof. The nonaqueous electrolyte may contain one kind of these nonaqueous solvents, and may contain two or more kinds thereof. Examples of the halogen substitutes include fluoride and the like.

Examples of the ester include carbonic acid esters and carboxylic acid esters. Examples of the cyclic carbonic acid ester include ethylene carbonate, propylene carbonate, vinylene carbonate (VC), and fluoroethylene carbonate (FEC). Examples of the chain carbonic acid ester include dimethyl carbonate (DMC), ethyl methyl carbonate (EMC), and diethyl carbonate. Examples of the cyclic carboxylic acid ester include γ-butyrolactone and γ-valerolactone. Examples of the chain carboxylic acid ester include ethyl acetate, methyl propionate, and methyl fluoropropionate. Among them, from the viewpoint of charge and discharge efficiency, at least one of vinylene carbonate (VC) and fluoroethylene carbonate (FEC) are preferably used.

Ether includes cyclic ether and chain ether. Examples of the cyclic ether include 1,3-dioxolane, 4-methyl-1,3-dioxolane, tetrahydrofuran, and 2-methyltetrahydrofuran. Chain ethers include 1,2-dimethoxyethane, diethyl ether, ethyl vinyl ether, methyl phenyl ether, benzyl ethyl ether, diphenyl ether, dibenzyl ether, 1,2-diethoxyethane, diethylene glycol dimethyl ether, and the like.

Examples of the nitrile include acetonitrile, propionitrile, and benzonitrile. Examples of the amide include dimethylformamide and dimethylacetamide.

[Separator]

A separator is interposed between the positive electrode and the negative electrode. The separator is excellent in ion permeability and has appropriate mechanical strength and electrically insulating properties. The separator may be, for example, a microporous thin film, a woven fabric, or a nonwoven fabric. The separator is preferably made of, for example, polyolefin, such as polypropylene or polyethylene.

[Lithium Secondary Battery]

FIG. 3 is a longitudinal sectional view of an example of a cylindrical lithium secondary battery according to an embodiment of the present invention.

A lithium secondary battery 100 is a wound-type battery including a wound-type electrode group 40 and a nonaqueous electrolyte (not shown). The wound electrode group 40 includes a strip-shaped positive electrode 10, a strip-shaped negative electrode 20, and a separator 30. A positive electrode lead 13 is connected to the positive electrode 10, and a negative electrode lead 23 is connected to the negative electrode 20.

One end portion in the length direction of the positive electrode lead 13 is connected to the positive electrode 10, and the other end thereof is connected to a sealing plate 90. The sealing plate 90 includes a positive electrode terminal 15. One end of the negative electrode lead 23 is connected to the negative electrode 20 and the other end thereof is connected to the bottom of a battery case 70 serving as the negative electrode terminal. The battery case 70 is a bottomed cylindrical battery can: one end in the longitudinal direction is opened, and the bottom of the other end serves as the negative electrode terminal. The battery case (battery can) 70 is made of metal, for example, formed of iron. To the inner surface of the iron battery case 70, usually nickel plating is applied. To the top and bottom of the wound-type electrode group 40, an upper insulating ring 80 and a lower insulating ring 60 made of resin are disposed.

In the illustrated example, a cylindrical lithium secondary battery including a wound-type electrode group has been described, but the present embodiment is not limited to this case and can be applied to other cases. The shape of the lithium secondary battery can be appropriately selected from various shapes depending on the application, and can be, in addition to the cylindrical shape, a coin-shaped, prism-shaped, sheet-type, and flat-type. The form of the electrode group is not particularly limited as well, and may be a stacked type. In addition, other than the negative electrode structure of the lithium secondary battery, a known structure can be used without any particular limitation.

The present invention will be specifically described below with reference to Examples and Comparative Examples. The present invention, however, is not limited to the following Examples.

Example 1

(1) Preparation of Positive Electrode

A lithium-nickel composite oxide ($LiNi_{0.8}Co_{0.18}Al_{0.02}O_2$), acetylene black, and PVdF were mixed at a mass ratio of 95:2.5:2.5, and NMP was added to the mixture. The mixture was then stirred using a mixer (T.K. HIVIS MIX, manufactured by PRIMIX Corporation) to prepare a positive electrode slurry. Next, the positive electrode slurry was applied to the surface of the Al foil, and the coating film was dried, and then rolled to prepare a positive electrode having a positive electrode mixture layer having a density of 3.6 g/cm³ formed on both surfaces of the Al foil.

(2) Preparation of Negative Electrode
(i) Negative Electrode Current Collector

Electrolytic copper foil (thickness 10 μm) was cut into a predetermined electrode size to obtain a negative electrode current collector.

(ii) First Layer

Artificial graphite (average particle diameter 3 μm) as an active material, acetylene black, and PVdF were mixed at a mass ratio of 90:3:7, and NMP was added to the mixture. The mixture was then stirred using a mixer (T.K. HIVIS MIX, manufactured by PRIMIX Corporation) to prepare a slurry. Next, the slurry was applied to the surface of the negative electrode current collector, and the coating film was dried, and then rolled to form a first layer on both surfaces of the negative electrode current collector.

(iii) Third Layer

A raw material liquid containing PVdF (concentration 8% by mass) and NMP was prepared. After coating the above raw material liquid on both main surfaces of the first layer, hot air drying was performed to form a porous film having a thickness of 3 μm as a third layer.

The cross section in the thickness direction of the obtained negative electrode was observed by SEM, and it was confirmed that a plurality of through holes having an average diameter of 800 nm was formed in the third layer.

(3) Preparation of Nonaqueous Electrolytes

FEC and EMC and DMC were mixed at a volume ratio of 20:5:75. A nonaqueous electrolyte was prepared by dissolving lithium difluorooxalate borate and $LiPF_6$ so that in the obtained mixed solvent, lithium difluorooxalate borate was 0.3 mol/L and $LiPF_6$ was 1.0 mol/L.

(4) Fabrication of Batteries

A tab made of Al was attached to the positive electrode obtained above. A tab made of Ni was attached to the negative electrode obtained above. In an inert gas atmosphere, a positive electrode and a negative electrode were spirally wound with a polyethylene thin film (separator) interposed therebetween to produce a wound-type electrode body. The obtained electrode body was accommodated in a bag-like outer package formed of a laminated sheet having an Al layer, and after the above-mentioned nonaqueous electrolyte was injected, the outer package was sealed to produce a lithium secondary battery A1.

Example 2

A lithium secondary battery A2 was prepared in the same manner as in Example 1, except that a porous film having a thickness of 3 μm was formed as a third layer on both main surfaces of the first layer using a raw material liquid containing PVdF (concentration: 8% by mass), LiFSI (denoted as LFSI in Table 1) (concentration: 1% by mass) and NMP in the step of forming the third layer.

Example 3

A lithium secondary battery A3 was produced in the same manner as in Example 2, except that aluminum films having a thickness of 0.1 μm were formed on both surfaces of the negative electrode current collector by the sputtering method without using a slurry containing artificial graphite in the step of forming the first layer.

Example 4

A lithium secondary battery A4 was produced in the same manner as in Example 3, except that the thickness of the aluminum film was changed to 0.01 μm in the step of forming the first layer.

Example 5

A lithium secondary battery A5 was produced in the same manner as in Example 4, except that the thickness of the porous film was changed to 5 μm in the step of forming the third layer.

Comparative Example 1

A lithium secondary battery R1 was produced in the same manner as in Example 1, except that the first layer and the third layer were not provided on the negative electrode current collector.

Comparative Example 2

A lithium secondary battery R2 was produced in the same manner as in Example 1, except that the third layer was not provided on the negative electrode current collector.

Comparative Example 3

A lithium secondary battery R3 was produced in the same manner as in Example 3, except that the third layer was not provided on the negative electrode current collector.

Comparative Example 4

A lithium secondary battery R4 was produced in the same manner as in Example 4, except that the third layer was not provided on the negative electrode current collector.

Comparative Example 5

A lithium secondary battery R5 was produced in the same manner as in Example 1, except that the first layer was not provided on the negative electrode current collector.

Comparative Example 6

A lithium secondary battery R6 was produced in the same manner as in Example 2, except that the first layer was not provided on the negative electrode current collector.

[Evaluation]

The obtained batteries A1-A5 and R1-R6 were subjected to a charge and discharge test.

In the charge and discharge test, the battery was charged under the following conditions in a constant temperature bath at 25° C., then rested for 20 minutes, and discharged under the following conditions. This set of charging and discharging is regarded as 1 cycle, and the batteries were subjected to the charge and discharge test of 50 cycles: a value obtained by dividing the discharge capacity of the 50th cycle by the discharge capacity of the first cycle was regarded as a capacity retention rate (%). The evaluation results are shown in Table 1.

(Charge)

Constant current charging at a current of 20 mA was performed until the battery voltage reached 4.1V, then the constant voltage charging was performed at a voltage of 4.1V until the current value reached 2 mA.

(Discharge)

Constant current discharge was performed at a current of 20 mA until the battery voltage reached 3.0V.

TABLE 1

| Battery | First Layer | | Third Layer | | Capacity Retention Rate(%) |
|---|---|---|---|---|---|
| | Material | Thickness(μm) | Material | Thickness(μm) | |
| A1 | Graphite | 10 | PVdF | 3 | 72.3 |
| A2 | Graphite | 10 | PvdF + LFSI | 3 | 73.1 |
| A3 | Al film | 0.1 | PvdF + LFSI | 3 | 87.4 |
| A4 | Al film | 0.01 | PvdF + LFSI | 3 | 81.8 |
| A5 | Al film | 0.01 | PvdF + LFSI | 5 | 81.1 |
| R1 | None | — | None | — | 68.8 |
| R2 | Graphite | 10 | None | — | 70.9 |
| R3 | Al film | 0.1 | None | — | 66.6 |
| R4 | Al film | 0.01 | None | — | 70.1 |
| R5 | None | — | PVdF | 3 | 66.6 |
| R6 | None | — | PvdF + LFSI | 3 | 67.9 |

In Table 1, when the negative electrode includes the first layer and the third layer, the capacity retention rate is remarkably improved as compared with the case where the negative electrode does not include the first layer or the third layer. On the other hand, when the negative electrode includes only the first layer, although a slight improvement in the capacity retention rate is observed in some comparative examples, such an improvement effect is insufficient. Further, it can be understood that when the negative electrode includes only the third layer, the capacity retention rate may be impaired.

In the above embodiment, a case in which a porous film is formed as the third layer has been described, but it is considered that the same result can be obtained even when a third layer (e.g., a solid electrolyte layer) of another form is formed.

INDUSTRIAL APPLICABILITY

Since the lithium secondary battery according to the present invention has excellent cycle characteristics, it can be used in electronic devices such as mobile phones, smartphones, tablet terminals, electric vehicles including hybrid and plug-in hybrid electric vehicles, and household storage batteries in combination with solar cells.

REFERENCE SIGNS LIST

10 Positive electrode
11 Positive electrode current collector
12 Positive electrode mixture layer
13 Positive electrode lead
15 Positive electrode terminal
20 Negative electrode
21 Negative electrode current collector
221 First layer
222 Second layer
223 Third layer
223a Facing region
223b Non-facing region
23 Negative electrode lead
30 Separator
40 Wound electrode group
60 Lower insulation ring
70 Battery case
80 Upper insulating ring
90 Sealing plate
100 Lithium secondary battery

The invention claimed is:

1. A lithium secondary battery comprising a positive electrode, a negative electrode, a lithium ion conductive nonaqueous electrolyte, and a separator disposed between the positive electrode and the negative electrode, wherein the positive electrode includes a positive electrode mixture layer containing a positive electrode active material and a positive electrode current collector, on the negative electrode, lithium metal deposits during charging, and the lithium metal is dissolved during discharging, the negative electrode includes a negative electrode current collector, and a plurality of layers stacked on the negative electrode current collector, the plurality of layers include a first layer, a second layer, and a third layer, of the first to third layers, the first layer is closest to the negative electrode current collector, and the third layer is farthest from the negative electrode current collector, the first layer contains a material capable of storing lithium ions, the second layer formed of lithium metal that deposits between the first layer and the third layer, the third layer has an insulation property and a lithium ion permeability, the third layer has a non-facing region that does not overlap the positive electrode mixture layer, and at least a portion of the non-facing region is in contact with the negative electrode current collector in a charged state.

2. The lithium secondary battery according to claim 1, wherein the first layer has a thickness of 0.01 μm or more and 10 μm or less.

3. The lithium secondary battery according to claim 1, wherein the material capable of storing lithium ions is a carbon material.

4. The lithium secondary battery according to claim 1, wherein the material capable of storing lithium ions is a metal alloyable with lithium.

5. The lithium secondary battery according to claim 1, wherein the second layer has a thickness in a range of 1 to 50 μm during charge and discharge.

6. The lithium secondary battery according to claim 1, wherein the third layer has a thickness of 0.1 μm or more and 5 μm or less.

7. The lithium secondary battery according to claim 1, wherein the third layer is a porous film.

8. The lithium secondary battery according to claim 7, wherein the porous film has a polymer matrix having a unit derived from vinylidene fluoride.

9. The lithium secondary battery according to claim 7, wherein the porous film includes at least one selected from the group consisting of a lithium salt and a normal temperature molten salt.

10. The lithium secondary battery according to claim 1, wherein the positive electrode active material comprises a composite oxide comprising lithium and a transition metal, and a molar ratio of lithium to an amount of the transition metal is 0.9 to 1.

11. The lithium secondary battery according to claim 1, wherein the nonaqueous electrolyte includes at least one of fluoroethylene carbonate and vinylene carbonate.

12. The lithium secondary battery according to claim 1, wherein the nonaqueous electrolyte includes a lithium ion and an anion, and the anion includes at least one selected from the group consisting of an anion of imides and an anion of oxalates.

13. The lithium secondary battery according to claim 12, wherein the anion of imides is at least one of bis(fluorosulfonyl)imide anion and bis(trifluoromethylsulfonyl)imide anion.

* * * * *